United States Patent
Wu (10) Patent No.: US 9,816,664 B2
(45) Date of Patent: Nov. 14, 2017

(54) SUPPORT FOR ELECTRONIC DEVICE

(71) Applicant: TRIWOOD TECHNOLOGY CO., LTD., Taipei (TW)

(72) Inventor: Yi-Chen Wu, Taipei (TW)

(73) Assignee: Triwood Technology Co., Ltd., Taipei (TW)

( * ) Notice: Subject to any disclaimer, the term of this patent is extended or adjusted under 35 U.S.C. 154(b) by 0 days.

(21) Appl. No.: 15/256,978

(22) Filed: Sep. 6, 2016

(65) Prior Publication Data
US 2017/0299113 A1    Oct. 19, 2017

(30) Foreign Application Priority Data
Apr. 19, 2016 (CN) .................... 2016 2 0327912 U (51) Int. Cl.
*A47B 23/04* (2006.01)
*F16M 13/00* (2006.01)
*F16B 1/00* (2006.01)

(52) U.S. Cl.
CPC .............. *F16M 13/00* (2013.01); *A47B 23/04* (2013.01); *F16B 1/00* (2013.01); *A47B 23/043* (2013.01); *F16B 2001/0028* (2013.01); *F16B 2001/0035* (2013.01)

(58) Field of Classification Search
USPC ............ 248/441.1, 444, 448, 459, 460, 461; 40/124.08, 124.12, 124.15, 124.14
See application file for complete search history.

(56) References Cited

U.S. PATENT DOCUMENTS

| | | | | |
|---|---|---|---|---|
| 844,066 | A * | 2/1907 | Warren | A47B 23/042 211/24 |
| 1,675,060 | A * | 6/1928 | Simmons | B41J 29/15 248/459 |
| 4,798,747 | A * | 1/1989 | Laramee | E01F 9/654 116/63 C |
| 5,628,396 | A * | 5/1997 | Weiner | B65D 5/029 206/216 |
| 5,868,373 | A * | 2/1999 | Duff | A47B 23/044 248/459 |
| 6,494,323 | B1 * | 12/2002 | Chalmers | A45C 11/00 206/350 |
| 7,389,908 | B2 * | 6/2008 | Cohen | B65D 5/008 206/459.5 |
| 7,690,321 | B2 * | 4/2010 | Karow | E01F 13/02 116/63 P |

* cited by examiner

*Primary Examiner* — Alfred Wujciak
(74) *Attorney, Agent, or Firm* — Rosenberg, Klein & Lee (57) ABSTRACT

The present invention relates to a support for electronic device, which comprises an accommodating member. The accommodating member includes three accommodating space. A first support plate, a second support plate and a third support plate are deposed in three accommodating space. A second foldable part is disposed between the second support plate and a third support plate. In addition, the third support plate and the first support plate are disposed symmetrically on both sides of the second support plate. The fixing member is disposed on a first edge of the first support plate, a second edge of the second support plate, and a third edge of the third support plate. The fixing member connects and fixes each pair of said first edge, said second edge, and said third edge. Then the support for electronic device forms a stereoscopic shape.

4 Claims, 10 Drawing Sheets

SUPPORT FOR ELECTRONIC DEVICE

FIELD OF THE INVENTION

The present invention relates generally to a support, and particularly to a transformable support for electronic device.

BACKGROUND OF THE INVENTION

Thanks to technological progresses, various 3C electronic products are introduced, benefiting many people. People carry electronic devices, such as notebook computers, smartphones, tablet computers, to satisfy needs in life and work and further make life more convenient. The pace of updating and advancement for various electronic devices is extremely fast. Currently, almost everyone owns a smartphone or a tablet computer. It is thus evident that such handheld mobile devices have become popular increasingly. They are closely linked to modern lives. Up to now, there are many models of cellular phones and tablets. Based on the phone modes, more peripheral products for cellular phones appear, bringing more convenience in usage. In particular, the peripheral equipment for tablet computers and smartphones appear more extensively.

By means of the portable electronic devices including handheld tablets or smartphones, file and data downloading or access may be done via network transmission anytime and anywhere. In addition, activities such as reading network information, listening to music, or even viewing multimedia movies may be performed. Due to their multiple functions, electronic devices are used much more frequently.

As implied in the name, handheld electronic devices mean using electronic devices by holding them in hands. Unfortunately, owing to their multiple functions as described above, handheld electronic devices are usually used for a long time. While viewing multimedia movies or films through handheld electronic devices, it normally takes more than half an hour. While watching a multimedia movie, even if an electronic device is not heavy, long-term holding an electronic device affects hands. If the time for holding a cellular phone a short and the symptoms are light, muscular pains might occur to the hands. If the time is longer, because the elbow is bent for a long time for holding an electronic device, the ulnar nerve will be stretched excessively, retarding the blood flow, imposing great pressure on the ulnar nerve, and resulting in discomfort at the forearm, the ring finger, as well as the little finger. As a consequence, the cubital tunnel syndrome occurs. For serious ones, surgeries are required for treatment.

Although some commercial protective covers or bags for electronic devices provide structures similar to phone supports or cradles, the purpose of protective covers and bags for electronic devices is to protect electronic devices and reduce the damages due to bumps, instead of supporting electronic devices during usage. Given the different purposes, supporting is not the main focus of the structure. Thereby, the support of the structure of protective covers or bags for electronic devices might degenerate and finally be unusable. In addition, not all protective covers and bags for electronic devices include the function of supporting.

Accordingly, for improving the drawbacks in the prior art, the present invention provides a support for electronic device, which occupies least space for storage and is transformable to form a support cradle for electronic devices for usage.

SUMMARY

An objective of the present invention is to provide a support for electronic device, which may transform to form a stereoscopic support cradle for supporting electronic devices for usage.

Another objective of the present invention is to provide a support for electronic device, which may transform to form a flat structure for ease of storage.

The present invention provides a support for electronic device, which comprises an accommodating member, a first support plate, a second support plate, a third support plate, and a fixing member. The accommodating member includes a first accommodating space, a second accommodating space, and a third accommodating space. The first support plate is disposed in the first accommodating space. The second support plate is disposed in the second accommodating space and adjacent to one side of the first support plate. A first foldable part is disposed between the first support plate and the second support plate. The third support plate is disposed in the third accommodating space and adjacent to one side of the second support plate. A second foldable part is disposed between the second support plate and the third support plate. In addition, the third support plate and the first support plate are disposed symmetrically on both sides of the second support plate. The fixing member is disposed on a first edge of the first support plate, a second edge of the second support plate, and a third edge of the third support plate. The first foldable part and the second foldable part of the accommodating member fold. The fixing member connects and fixes each pair of the first, second, and third edges. Then the support for electronic device forms a stereoscopic shape.

According to an embodiment of the present invention, the support for electronic device further comprises a carrying plate disposed in a fourth accommodating space of the accommodating member and located on the side of the second support plate not adjacent to the edges of the first and third support plates. Besides, a third foldable part is disposed between the carrying plate and the second support plate.

According to an embodiment of the present invention, the support for electronic device further comprises a fixing plate disposed at the accommodating member and on the carrying plate.

According to an embodiment of the present invention, the support for electronic device further comprises a cover member disposed on one side of the accommodating member and located on the outer edge of the first support plate or the outer plate of the third support plate.

According to an embodiment of the present invention, the fixing member is a zipper, a magnetic structure, a buckle structure, or a Velcro strap.

According to an embodiment of the present invention, the fixing member is a zipper. The accommodating member further includes a protective plate disposed on the second edge.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
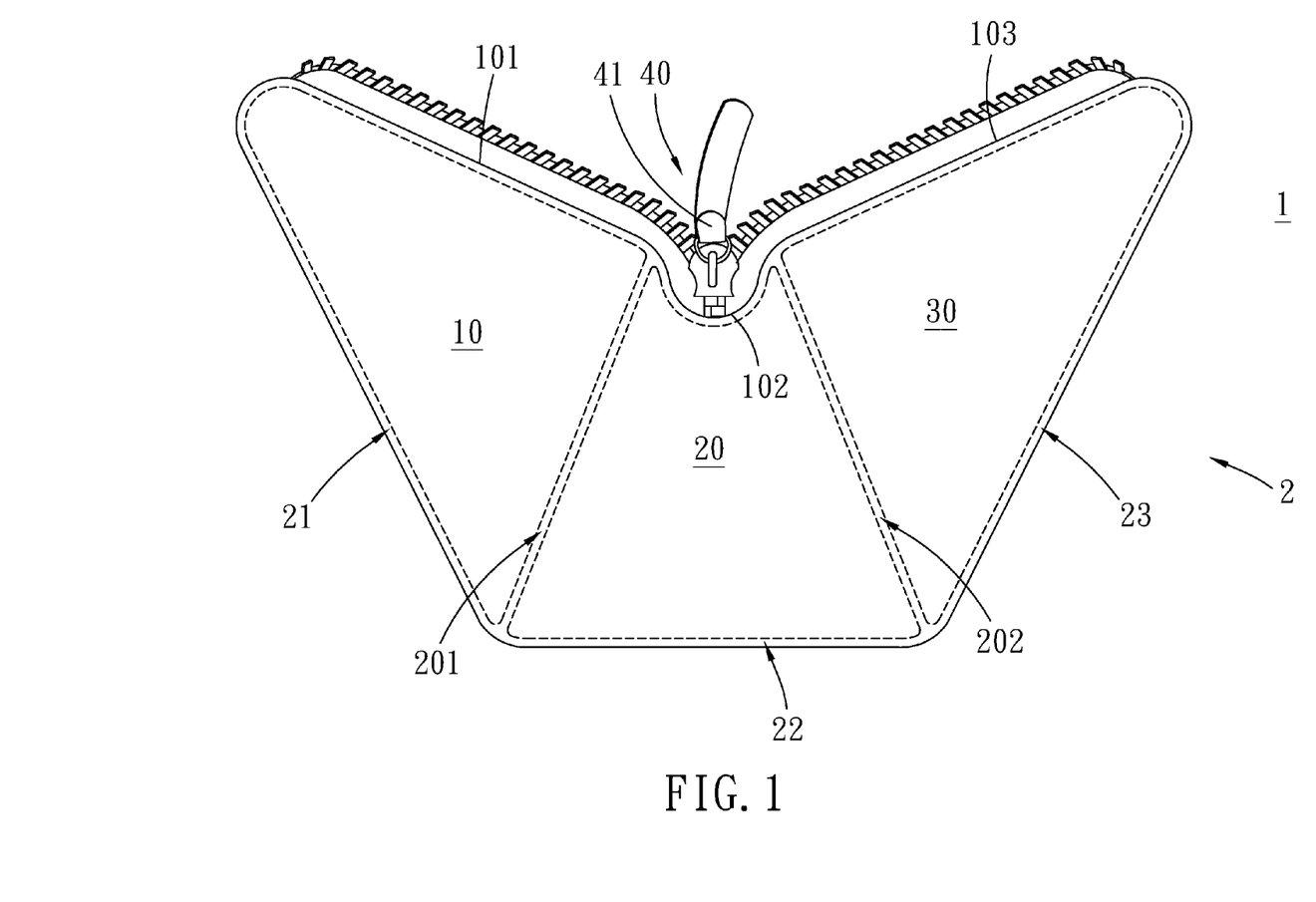
FIG. 1 shows an expanded view of the support for electronic device according to the first embodiment of the present invention.
Figure 2:
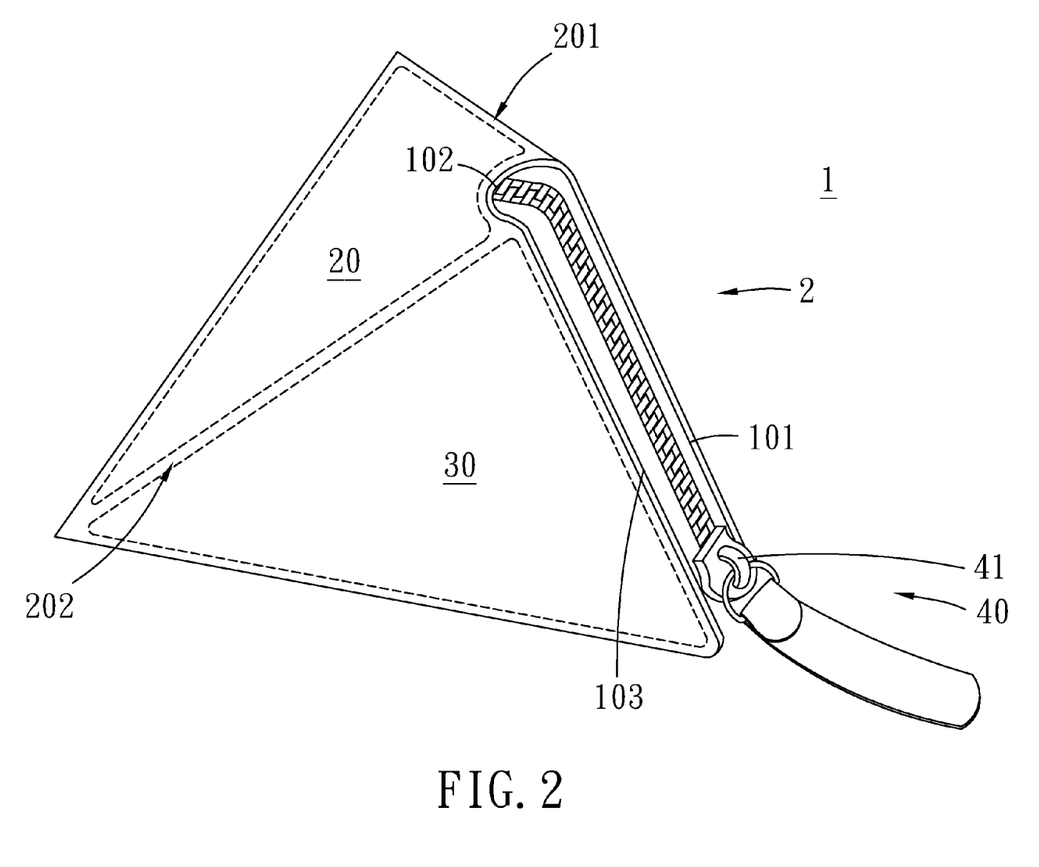
FIG. 2 shows a stereoscopic view of the support for electronic device according to the first embodiment of the present invention.

Please refer to FIG. 1 and FIG. 2, which show an expanded view and a stereoscopic view of the support for electronic device according to the first embodiment of the present invention. As shown in the figures, the present embodiment provides a support for electronic device 1. When an electronic device is placed upright, the support for electronic device 1 may transform to become a support behind the electronic device. No matter in the landscape or the portrait orientation, the electronic device may be supported stably and kept in the upright condition. Accordingly, while using the electronic device for a long time, it is no more required to hold the electronic device long-termly for usage and hence reducing influences or damages on hands. In addition, while storing the support for electronic device 1, it may transform to become a flat shape. By occupying minimum space, storage may be easy.

The support for electronic device 1 comprises an accommodating member 2, a first support plate 10, a second support plate 20, a third support plate 30, and a fixing member 40. The accommodating member 2 includes a first accommodating space 21, a second accommodating space 22, and a third accommodating space 23. The first support plate 10 is disposed in the first accommodating space 21. The second support plate 20 is disposed in the second accommodating space 22 and adjacent to one side of the first support plate 10. A first foldable part 201 is disposed between the first support plate 10 and the second support plate 20. The third support plate 30 is disposed in the third accommodating space 23 and adjacent to one side of the second support plate 20. A second foldable part 202 is disposed between the second support plate 20 and the third support plate 30. In addition, the third support plate 30 and the first support plate 10 are disposed symmetrically on both sides of the second support plate 20. The fixing member 40 is disposed on a first edge 101 of the first support plate 10, a second edge 102 of the second support plate 20, and a third edge 103 of the third support plate 30.

Figure 3:
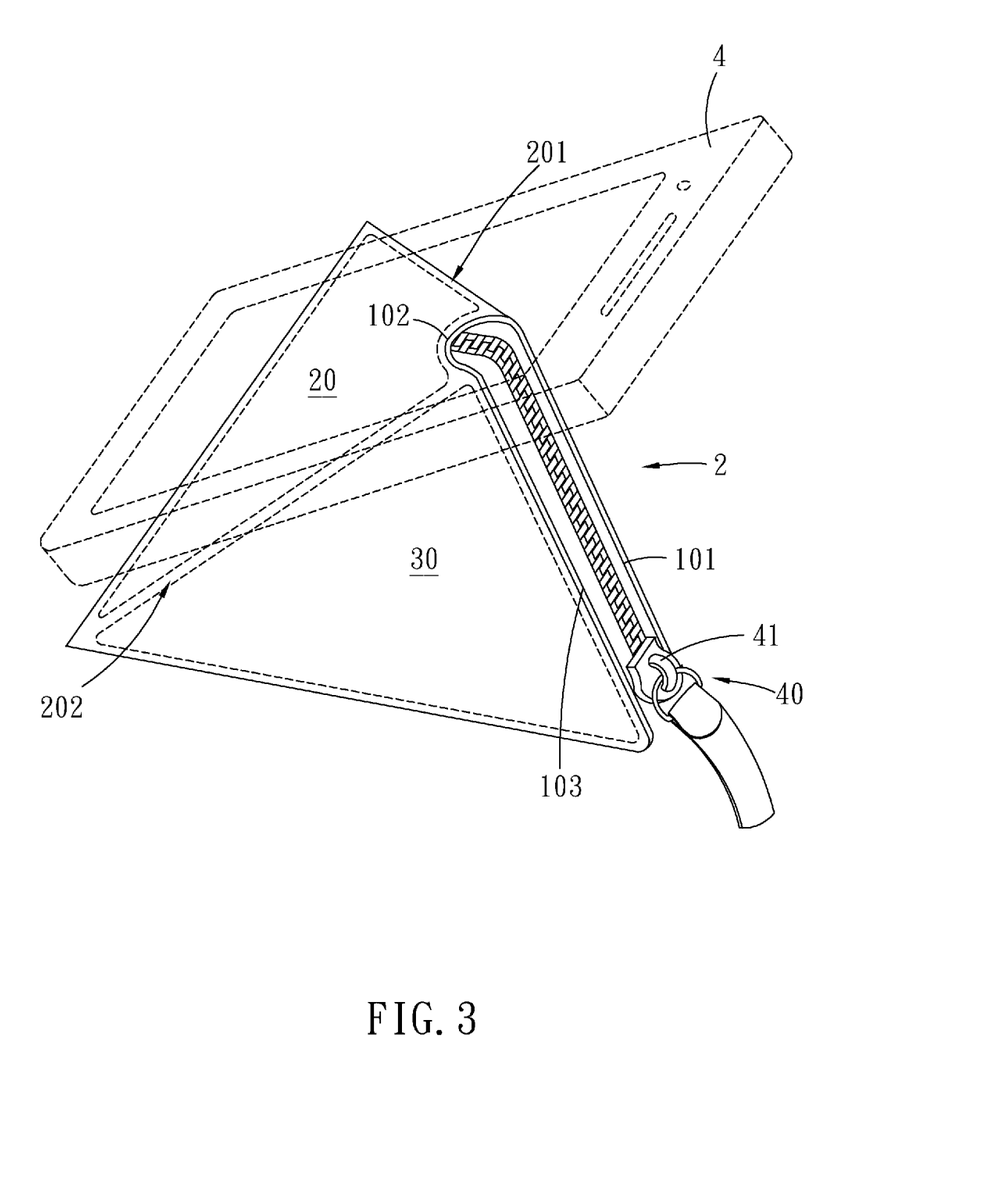
FIG. 3 shows a usage status view of the support for electronic device according to the first embodiment of the present invention.
Figure 4:
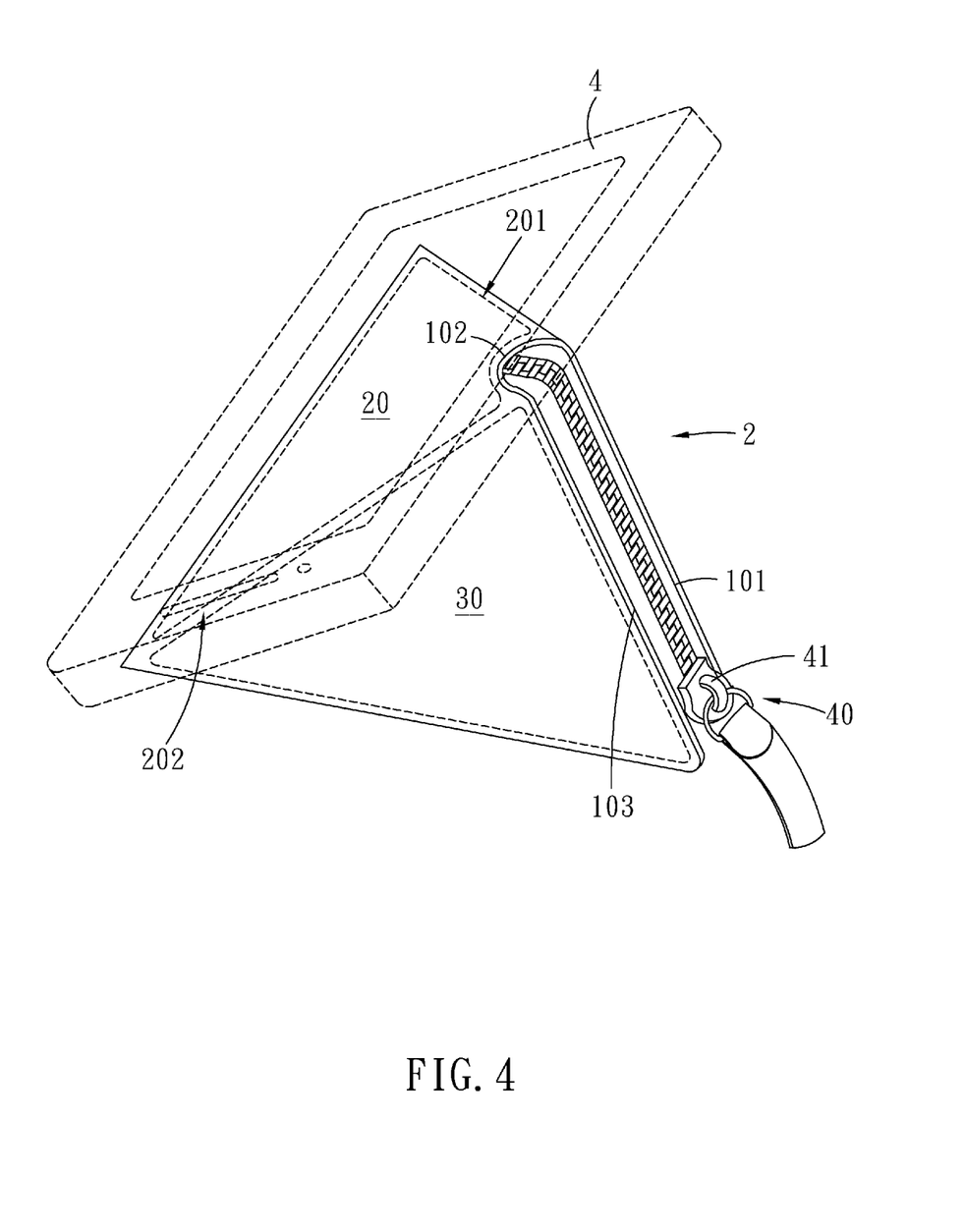
FIG. 4 shows another usage status view of the support for electronic device according to the first embodiment of the present invention.

Please refer FIG. 3 and FIG. 4, which show a usage status view and another usage status view of the support for electronic device according to the first embodiment of the present invention. As shown in the figures, when the support for electronic device 1 according to the present embodiment is not in use, it is a flat shape, as shown in FIG. 1. Under this condition, the space occupied by the support for electronic device 1 is small, enabling ease of storage. On the contrary, when the support for electronic device 1 according to the present embodiment is in use, the first folding part 201 and the second folding part 202 fold. They both fold towards the direction of the first, second, and third edges 101, 102, 103 such that the first, second, and third edges 101, 102, 103 approach to one another. As the first, second, and third edges 101, 102, 103 are next to one another, the fixing member 40 is used for connecting and fixing each pair of the first, second, and third edges 101, 102, 103. The fixing member 40 may be a zipper, a Velcro strap, a magnetic structure, or a buckle structure. Any fixing structure that is able to connect and fix each pair of the first, second, and third edges 101, 102, 103 may be adopted. According to the present embodiment, the fixing member 40 is a zipper 41 and the zipper teeth are disposed on the first, second, and third edges 101, 102, 103. When the zipper slider is pulled up, a portion of the first and second edges 101, 102 and another portion of the third and second edges 103, 102 are connected and fixed. Then the support for electronic device 1 forms a stereoscopic shape.

According to the present embodiment, the first, second, and third support plates 10, 20, 30 are triangular or close-to-triangular plates. Thereby, the support for electronic device 1 according to the present embodiment forms a pyramidal stereoscopic support structure.

After the above usage process, the support for electronic device 1 becomes stereoscopic. The sides of the first, second, and third support plates 10, 20, 30 without connection are used as the base of the stereoscopic support cradle. The second support plate 20 is used as the carrying surface of the support. The first and third support plates 10, 30 are symmetrical on the back of the second support plate 20 for supporting the support structure of the second support plate 20 and providing the second support plate 20 with the supporting force for supporting the electronic device. According to the present embodiment, an electronic device 4 is placed upright. The back of the electronic device 4 is against the second support plate 20, as shown in FIG. 3. Alternatively, the electronic device 40 may be placed in the landscape orientation. The back of the electronic device 4 is against the second support plate 20, as shown in FIG. 4.

The present embodiment improves the prior art. According to the prior art, not all protective covers and bags include the structure for placing the electronic device. Moreover, the support structure might not be suitable for placing all electronic devices in the landscape or portrait orientation. It costs a lot to purchase all protective covers or bags corresponding to all exterior structures of electronic devices for supporting. In addition, if protective covers or bags are used as a supporting structure, because their main purpose and efficacy are not supporting objects, the supporting force will be insufficient. The support for electronic device 1 provided by the present embodiment has the advantage of providing sufficient supporting force for supporting the electronic device, no matter the electronic device 4 is placed in the landscape or portrait orientation. Besides, the support for electronic device 1 may transform to a stereoscopic shape and be used as the support structure for the electronic device 4. Alternatively, it may transform to a plate shape for convenient storage.

Figure 5:
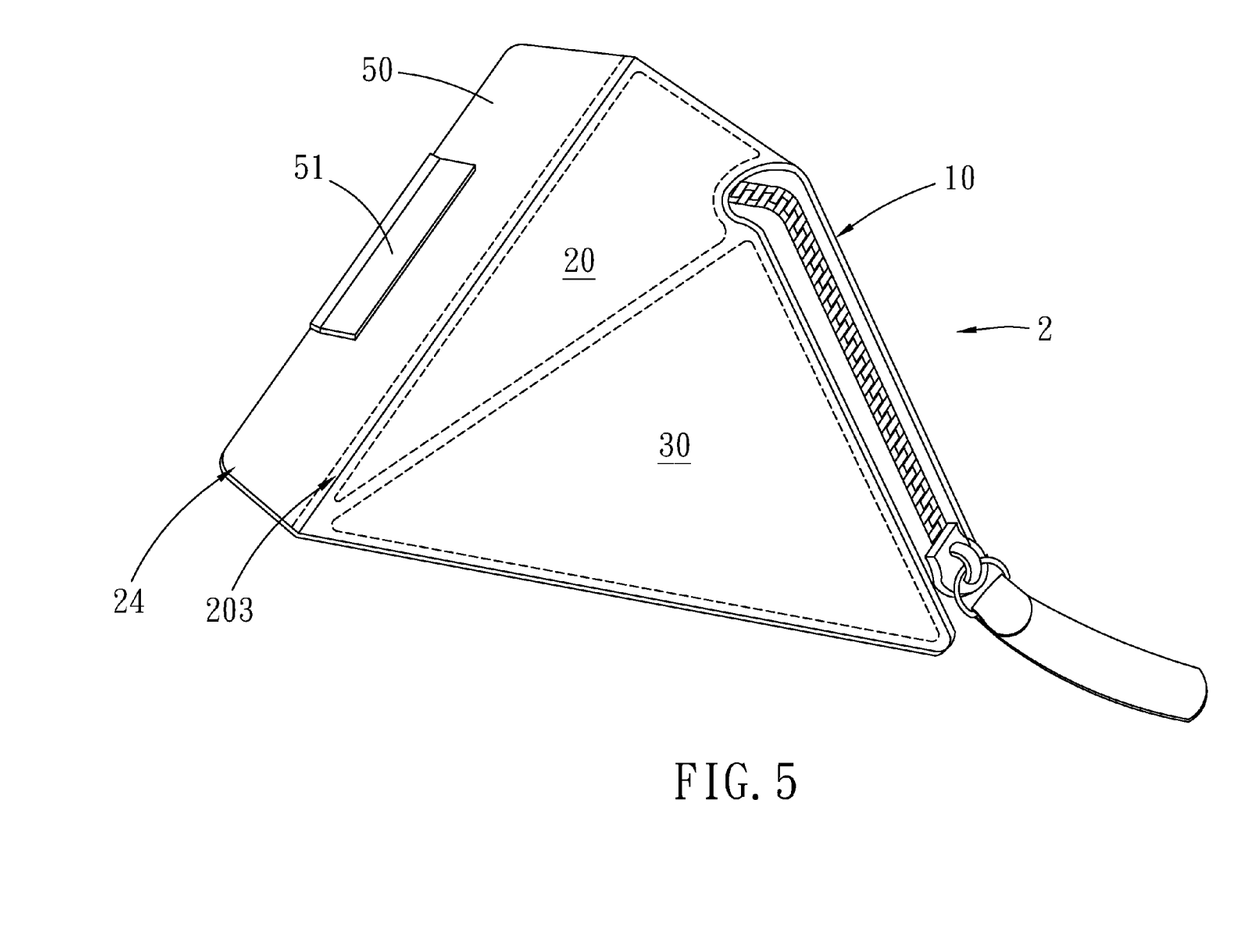
FIG. 5 shows a schematic view of the support for electronic device according to the second embodiment of the present invention.

Please refer to FIG. 5, which shows a schematic view of the support for electronic device according to the second embodiment of the present invention. As shown in the figure, the difference between the present embodiment and the first one is that the present embodiment further comprises a carrying plate 50 disposed in a fourth accommodating space 24 of the accommodating member 2 and located on the edge of the second support plate 20 not adjacent to the first and third support plates 10, 20. A foldable part 203 is disposed between the carrying plate 50 and the second support plate 20. When the support for electronic device 1 is in use, the third foldable part 203 of the accommodating member 2 is folded up such that the carrying plate 50 is placed flat on the placing surface. As the back of the electronic device 4 is against the second support plate 20, the bottom of the electronic device 4 is placed on the carrying plate 50 as well. Thanks to the friction between the bottom of the electronic device 4 and the carrying plate 50, the electronic device 4 may be placed securely on the support for electronic device 1.

According to the present embodiment, the support for electronic device 1 further comprises a fixing plate 51. One side of the fixing plate 51 is disposed at the accommodating member 2 and located on the carrying plate 50. The material of the fixing plate 51 is flexible. When the support for electronic device 1 is in use, the back of the electronic device 4 is against the second support plate 20. The bottom of the electronic device 4 is also placed on the carrying plate 50. The front bottom of the electronic device 4 is blocked by the fixing plate 51 of the carrying plate 50, so that the electronic device 4 may be fixed on the support for electronic device 1. In addition, the external force may bend the other edge of the fixing plate 51. Thereby, the supporting area for the fixing plate 51 is increased, facilitating fixing the electronic device 4 more firmly.

Figure 6:
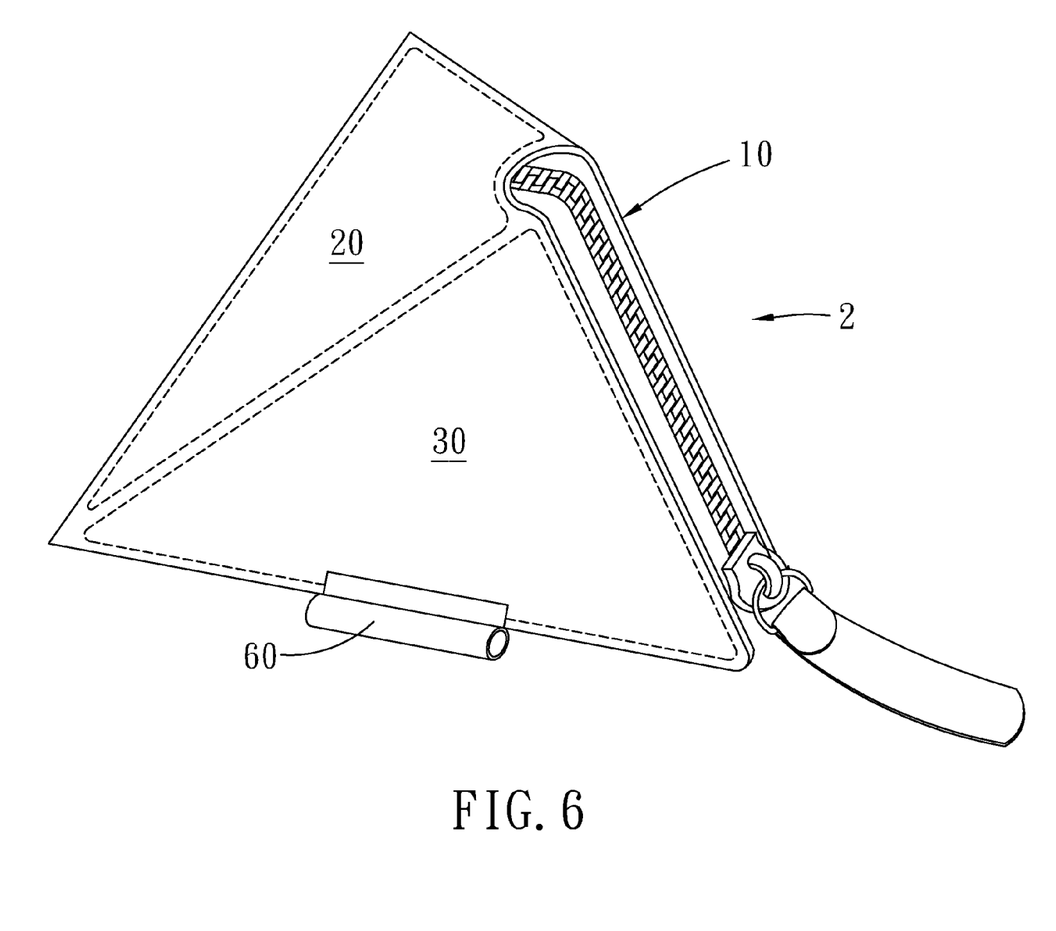
FIG. 6 shows a schematic view of the support for electronic device according to the third embodiment of the present invention.

Please refer to FIG. 6, which shows a schematic view of the support for electronic device according to the third embodiment of the present invention. As shown in the figure, the difference between the present embodiment and the first one is that the present embodiment further comprises a cover member 60 disposed on the surface of the accommodating member 2 and located on the outer edge of the first support plate 10 or the outer edge of the third support plate 30. The cover member 60 may be used for placing the touch stylus or pen. Thereby, the support for electronic device 1 may enhance usage convenience.

Figure 7:
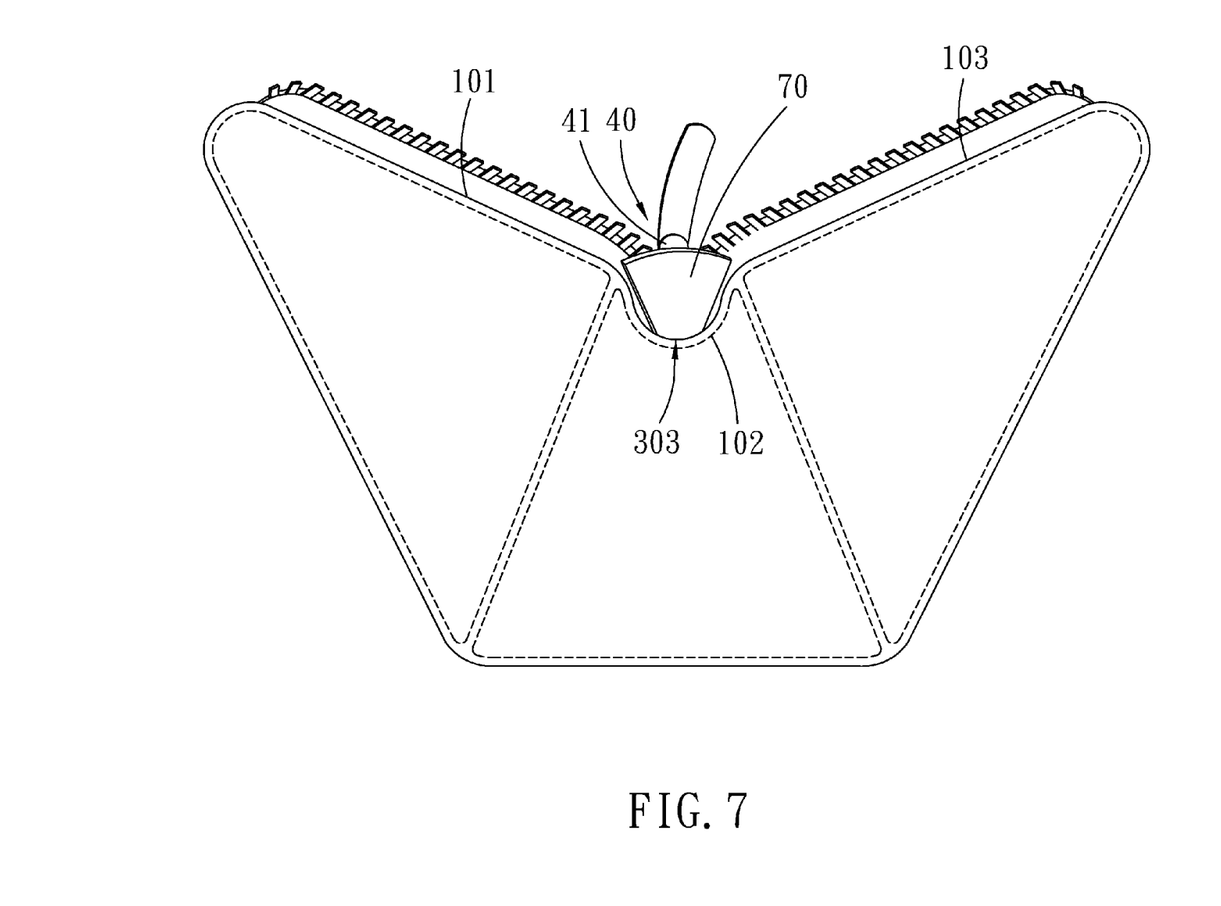
FIG. 7 shows a schematic view of the support for electronic device according to the fourth embodiment of the present invention.

Please refer to FIG. 7, which shows a schematic view of the support for electronic device according to the fourth embodiment of the present invention. As shown in the figure, the difference between the present embodiment and the first one is that the present embodiment further comprises a protective plate 70 located on the second edge 102 of the second support plate 20. When the protective plate 70 is the zipper 41, because the zipper slider is a projecting structure made of hard materials, it is prone to scratching objects, hooking objects such as threads, or damages. When the support for electronic device 1 is stored, the protective plate 60 may cover the zipper slider of the zipper 41. Thereby, the support for electronic device 1 and the objects stored with it may be protected or damages on the zipper slider may be avoided.

Figure 8:
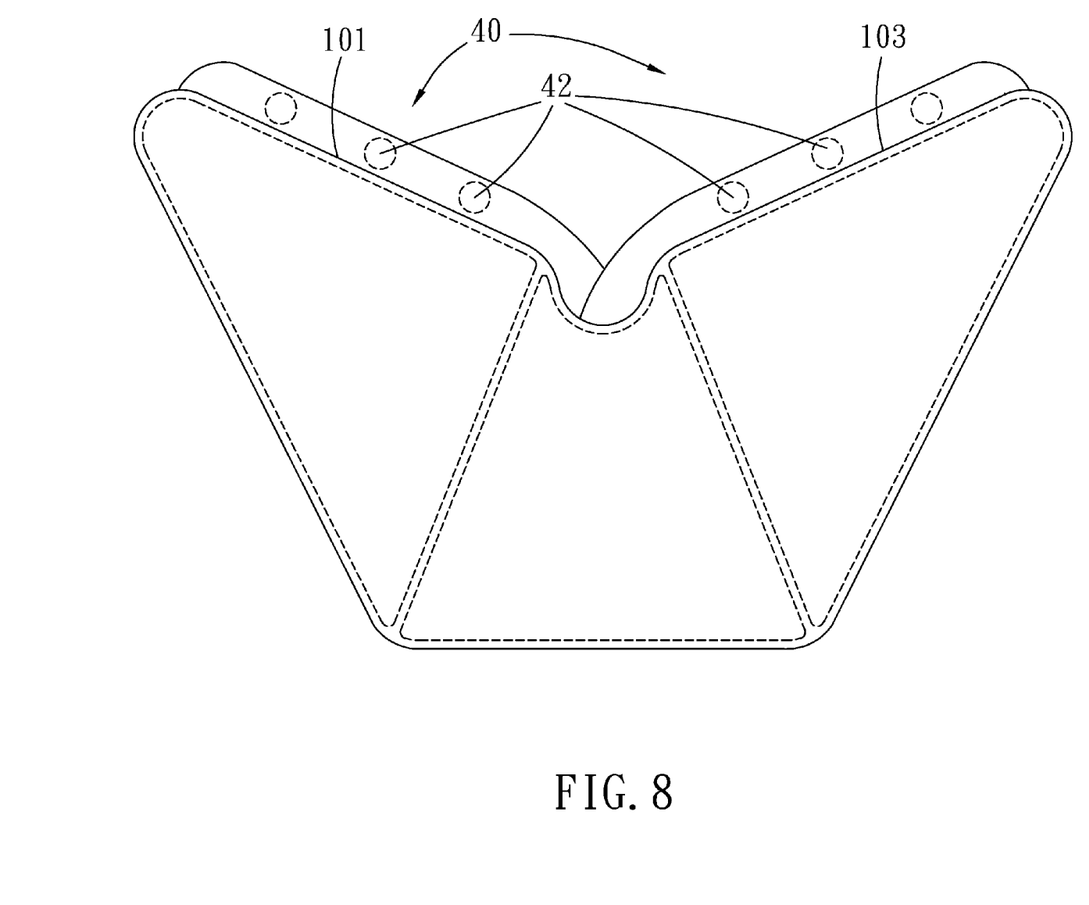
FIG. 8 shows a schematic view of the support for electronic device according to the fifth embodiment of the present invention.
Figure 9:
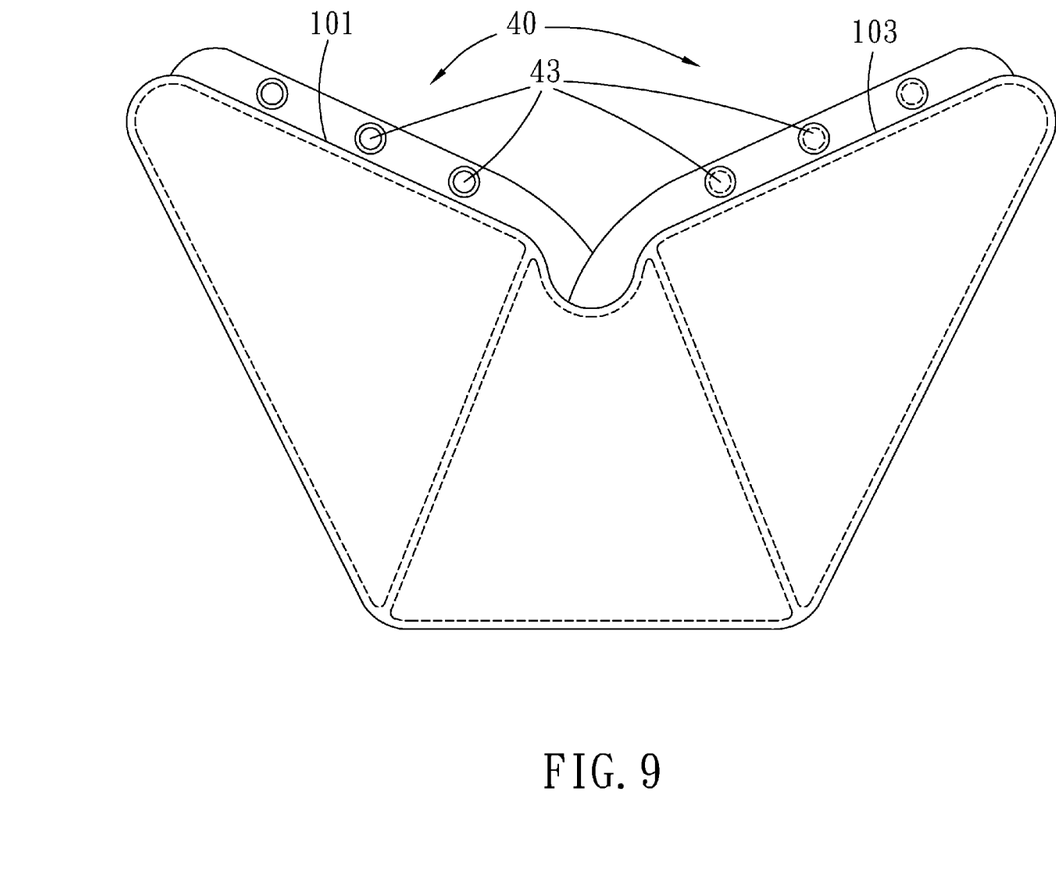
FIG. 9 shows a schematic view of the support for electronic device according to the sixth embodiment of the present invention.
Figure 10:
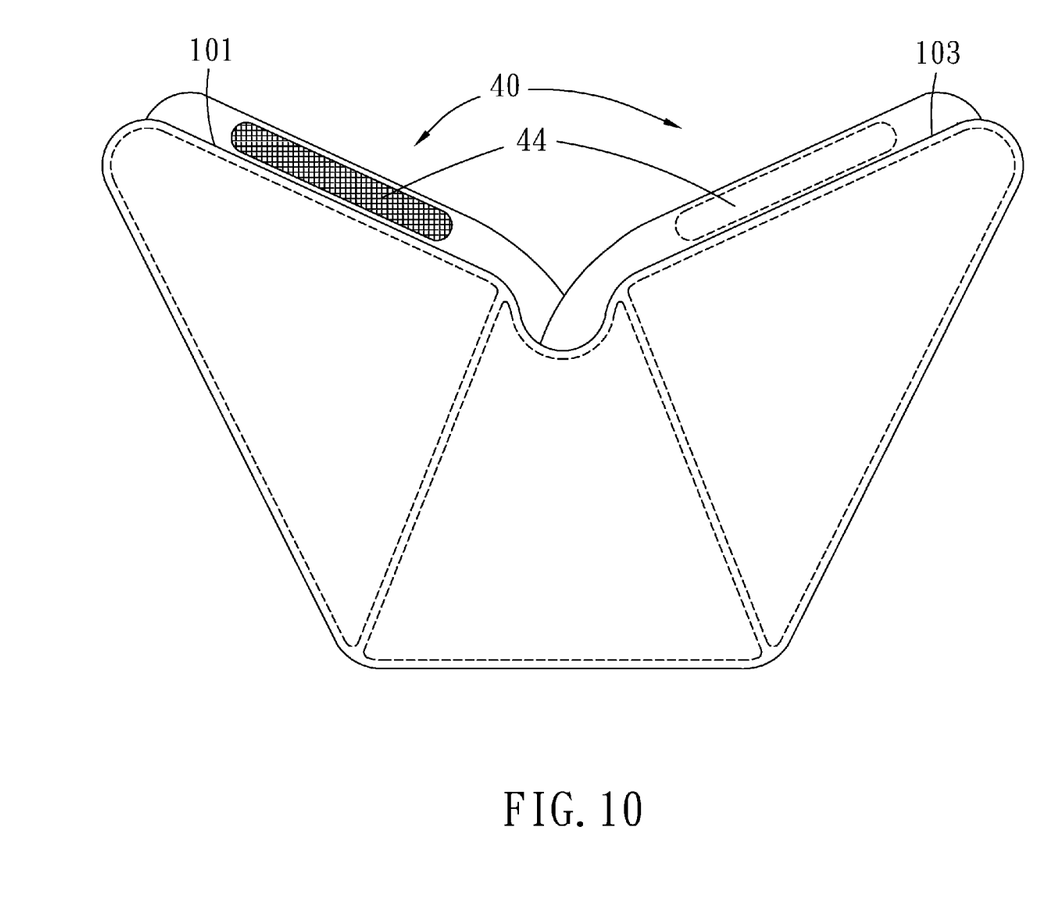
FIG. 10 shows a schematic view of the support for electronic device according to the seventh embodiment of the present invention.

Please refer to FIGS. 8 to 10, which show schematic views of the support for electronic device according to the fifth to the seventh embodiments of the present invention. As shown in the figures, the difference between the present embodiment and the first one is that the structures of the fixing members 40 are different. According to the fifth embodiment, the fixing member 40 is a magnetic structure 42. Magnets are disposed on the first and third edges 101, 103, respectively. By the attraction of the magnets, the first and third edges 101, 103 are mutually connected and fixed. According to the sixth embodiment, the fixing member 40 is a buckle structure 43. By using the method similar to the buckling of buttons, the first and third edges 101, 103 are mutually connected and fixed. According to the seventh embodiment, the fixing member 40 is a Velcro strap 44 disposed on the first and third edges 101, 103, respectively. By attaching the Velcro strap 44, the first and third edges 101, 103 are mutually connected and fixed.

To sum up, the present invention provides a support for electronic device, which comprises an accommodating member, a first support plate, a second support plate, a third support plate, and a fixing member. The accommodating member includes a first accommodating space, a second accommodating space, and a third accommodating space. The first support plate is disposed in the first accommodating space. The second support plate is disposed in the second accommodating space and adjacent to one side of the first support plate. A first foldable part is disposed between the first support plate and the second support plate. The third support plate is disposed in the third accommodating space and adjacent to one side of the second support plate. A second foldable part is disposed between the second support plate and the third support plate. In addition, the third support plate and the first support plate are disposed symmetrically on both sides of the second support plate. The fixing member is disposed on a first edge of the first support plate, a second edge of the second support plate, and a third edge of the third support plate. Then the support for electronic device forms a stereoscopic shape. Thereby, the support for electronic device may transform to a plate shape for easier storage. Alternatively, it may transform to a stereoscopic shape and become the support for the electronic device. In addition, the fixing member according to the present invention may be a zipper, a Velcro strap, a magnetic structure, or a buckle structure. It may be adjusted according to users' requirements. The purpose of the fixing member is to connect and fix each pair of the first, second, and third edges. Thereby, the structure of the fixing member is not limited. Besides, the present invention further comprises the carrying plate and the fixing plate for better fixing the electronic device. Moreover, the cover member improves convenience for users in using the support for electronic device.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:
1. A support for electronic device, comprising:
an accommodating member, including a first accommodating space, a second accommodating space, and a third accommodating space;
a first support plate, disposed in said first accommodating space;

a second support plate, disposed in said second accommodating space and adjacent to one side of said first support plate, and a first foldable part disposed between said first support plate and said second support plate;

a third support plate, disposed in said third accommodating space and adjacent to one side of said second support plate, a second foldable part disposed between said second support plate and said third support plate, and said third support plate and said first support plate disposed symmetrically on both sides of said second support plate; and a fixing member, disposed on a first edge of said first support plate, a second edge of said second support plate, and a third edge of said third support plate, wherein said fixing member is a zipper, and said accommodating member further includes a protective plate disposed on said second edge;

wherein said first foldable part and said second foldable part fold; said fixing member connects and fixes each pair of said first edge, said second edge, and said third edge; and said support for electronic device forms a stereoscopic triangular shape.

2. The support for electronic device of claim 1, and further comprising:

a carrying plate, disposed in a fourth accommodating space of said accommodating member and located on the edge of said second support plate not adjacent to said first support plate and said third support plate; and a third foldable part, disposed between said carrying plate and said second support plate.

3. The support for electronic device of claim 2, and further comprising a fixing plate disposed at said accommodating member and located on said carrying plate.

4. The support for electronic device of claim 1, and further comprising a cover member, disposed on one side of said accommodating member and located on the outer edge of said first support plate or the outer edge of said third support plate.

* * * * *